United States Patent [19]

Watanabe et al.

[11] 4,423,261

[45] Dec. 27, 1983

[54] PROCESS FOR PRODUCING A GRAPHITE FLUORIDE COMPRISING MAINLY POLYDICARBON MONOFLUORIDE REPRESENTED BY THE FORMULA $(C_2F)_n$

[75] Inventors: Nobuatsu Watanabe, 136, Uguisudai, Nagaokakyo-shi, Kyoto, Japan; Tsuyoshi Nakajima, Kyoto; Masayuki Kawaguchi, Arida, both of Japan

[73] Assignees: Nobuatsu Watanabe; Applied Science Research Institute, both of Kyoto, Japan

[21] Appl. No.: 338,108

[22] Filed: Jan. 8, 1982

[30] Foreign Application Priority Data

Sep. 10, 1981 [JP] Japan .................................. 56-143007

[51] Int. Cl.³ ............................................. C07C 17/00
[52] U.S. Cl. ..................................................... 570/150
[58] Field of Search .......................................... 570/150

[56] References Cited

U.S. PATENT DOCUMENTS

| | | |
|---|---|---|
| 4,243,615 | 1/1981 | Watanabe et al. |
| 2,770,660 | 11/1956 | Passino et al. .................. 570/150 |
| 3,872,032 | 3/1975 | Kanemaru et al. .............. 570/150 |
| 3,925,492 | 12/1975 | Ukaji et al. ..................... 570/150 |
| 3,929,918 | 12/1975 | Mesbri et al. ................... 570/150 |
| 3,929,920 | 12/1975 | Komo et al. ..................... 570/150 |
| Re 30,667 | 7/1981 | Watanabe et al. |

*Primary Examiner*—Charles F. Warren
*Assistant Examiner*—Joseph A. Boska
*Attorney, Agent, or Firm*—Armstrong, Nikaido, Marmelstein & Kubovcik

[57] ABSTRACT

A graphite fluoride comprising mainly poly-dicarbon monofluoride represented by the formula $(C_2F)_n$ can be produced in an extremely short period of time by a process comprising reacting a graphite material with fluorine in the presence of a specific fluoride.

6 Claims, No Drawings

PROCESS FOR PRODUCING A GRAPHITE FLUORIDE COMPRISING MAINLY POLYDICARBON MONOFLUORIDE REPRESENTED BY THE FORMULA $(C_2F)_n$

This invention relates to a process for producing a graphite fluoride comprising mainly poly-dicarbon monofluoride represented by the formula $(C_2F)_n$. More particularly, the present invention is concerned with a novel process for producing a graphite fluoride comprising mainly poly-dicarbon monofluoride represented by the formula $(C_2F)_n$, which comprises reacting a graphite material with fluorine in the presence of a specific fluoride whereby the reaction period of time is extremely shortened as compared with that of the conventional method, and which gives the graphite fluoride in a yield as large as 100% with respect to a graphite material.

Conventionally known graphite fluoride is poly-monocarbon monofluoride represented by the formula $(CF)_n$, which is highly appreciated, because of its peculiar properties, in a wide variety of industrial application fields. For example, $(CF)_n$ is useful as active materials in electrolytic cells, lubricants, anti-wetting, stain resistant and water and/or oil-repellent materials, etc. Especially, in the field of electrolytic cells, $(CF)_n$ is known to be an active material capable of providing a primary cell of high energy density and long shelf life in which voltage drop due to discharge is scarcely observed for a long period of time as disclosed in U.S. Pat. No. 3,536,532 Specification. However, $(CF)_n$ has fatal drawbacks or disadvantages in the production thereof, since the thermal decomposition temperature of $(CF)_n$ is extremely close to the temperature employed for the formation of the $(CF)_n$ so that during the formation of $(CF)_n$, $(CF)_n$ formed is liable to decompose, resulting in an extremely low yield of $(CF)_n$.

Watanabe et al. previously found a novel graphite fluoride, namely, poly-dicarbon monofluoride represented by the formula $(C_2F)_n$ and a process for the production thereof. $(C_2F)_n$ can be produced in extremely high yield, and hence can be provided at comparatively low cost. The novel graphite fluoride $(C_2F)_n$ can be obtained, as described in detail in Japanese Patent Application Laid-Open Specification No. 102893/1978, U.S. Pat. No. 4,243,615 specification and U.S. reissued Patent No. Re 30,667 Specification, by heating a graphite material at a temperature of 300° to 500° C. in an atmosphere of fluorine gas of 100 to 760 mmHg. As the graphite material to be used for the production of $(C_2F)_n$, there can be mentioned a natural graphite, an artificial graphite, a kish graphite, a pyrolytic graphite and mixtures thereof. The resulting $(C_2F)_n$ has a crystalline structure in which a layer structure is stacked with an interlayer spacing of about 9.0 Å to form a packing structure, and in each layer, alternate carbon atom is bonded to one fluorine atom, as different from $(CF)_n$ in which each carbon atom is bonded to one fluorine. Each of $(CF)_n$ and $(C_2F)_n$, however, has $CF_2$ and $CF_3$ groups as the peripheral groups at the terminals of the carbon hexagonal net work layer of the product. Therefore, when fluorination of a graphite has been completed, the F/C ratios of the resulting $(C_2F)_n$ and $(CF)_n$ exceed 0.5 and 1.0, respectively. The excess amount of fluorine due to the peripheral $CF_2$ and $CF_3$ groups increases as the crystallite size of the a,b-axis of a graphite fluoride crystal becomes small [see J. Amer. Chem. Soc., 101, 3832, (1979)]. There is a distinct difference in infrared spectrum between $(CF)_n$ and $(C_2F)_n$. Illustratively stated, the absorption peak at 940 cm$^{-1}$ is observed in the IR spectrum of $(C_2F)_n$, whereas said peak is not observed in the IR spectrum of $(CF)_n$, thus indicating that $(C_2F)_n$ is utterly different in structure from $(CF)_n$.

However, an extremely long period of time is disadvantageously required for the formation of $(C_2F)_n$ by completely fluorinating a graphite material without leaving any of the raw graphite material unreacted until a constant weight of the resulting reaction product is attained, especially under such mild conditions as will give $(C_2F)_n$ with high selectivity. For example, when a natural graphite from Madagascar ore having a particle size of 200 to 250 mesh (Tyler) is reacted at 375° C. with fluorine gas of 200 mmHg, the reaction time required is disadvantageously as long as 120 hours. Further, when a flaky graphite having a particle size of more than about 20 mesh (Tyler) is employed as the graphite material, the reaction time as long as several hundred hours is needed. Thus, the known process for preparing the novel graphite fluoride $(C_2F)_n$ of excellent properties has a serious drawbck in too long a reaction time thereof, though it provides the desired product in extremely high yield with respect not only to the graphite material employed but also to the fluorine employed.

We have made extensive and intensive investigations with a view to overcoming the above-mentioned drawback. As a result, it has unexpectedly been found that when the reaction of a graphite material with fluorine is conducted in the presence of a specific fluoride, the rate of reaction increases greatly as compared with that of the conventional process, leading to remarkable shortening of the necessary reaction period of time. The present invention has been made based on such a novel finding, about which an illustrative explanation is give as follows.

A mixture of 0.8 g of flaky graphite and 1 g of, for example, aluminium fluoride ($AlF_3$) was charged in a nickel vessel, and fluorine gas was then introduced to 760 mmHg at room temperature to 100° C. The reaction system was then allowed to stand at the above temperature for about 5 hours to form a graphite intercalation compound of aluminium fluoride, which was heated to 400° C. at a temperature elevation rate of 3° C./min. During the course of the heating, the interlayer spacing of the intercalation compound was expanded so as to release the intercalant $AlF_3$ therefrom, that is, decompose the intercalation compound while being accompanied by the weight decrease. When the heating was continued at 400° C. for 5 hrs, the reaction of the graphite with fluorine proceeded rapidly. Thereby, the intended graphite fluoride, namely a graphite fluoride comprising mainly $(C_2F)_n$ could be obtained in a short period of time. It is believed that the decomposition of the graphite intercalation compound and the formation of $(C_2F)_n$ do not completely stepwise occur but simultaneously to some extent.

The novel finding as described above is quite unexpected and surprising, and has, for the first time, been made by the present inventors.

More specifically, in accordance with the present invention, there is provided a process for preparing a graphite fluoride comprising mainly $(C_2F)_n$ which comprises reacting a graphite material with fluorine in the presence of a fluoride of at least one element selected from the group consisting of elements of alkali metals and alkaline earth metals, elements belonging to Groups I(b), II(b) and III of the periodic table, and elements of the first period of the transition elements.

The term "a graphite fluoride comprising mainly $(C_2F)_n$" used herein is intended to mean poly-dicarbon monofluoride represented by the formula $(C_2F)_n$ or a polycarbon fluoride composition consisting essentially of $C_2F$ stoichiometry and CF stoichiometry, the content of $C_2F$ stoichiometry being more than 50 mole %, based on the composition. The $(C_2F)_n$ content of the product cannot be exactly theoretical. Since the product obtained by the process of the present invention always carries $CF_2$ groups and $CF_3$ groups in the outermost surface regions of the particles of the product. Accordingly, the product obtained by the process of the present invention is also characterized by the process of peripheral $CF_2$ and $CF_3$ groups. If the presence of peripheral $CF_2$ groups and $CF_3$ groups is neglected, the product obtained by the process of the present invention should theoretically have a F/C ratio of 0.5 to 0.75. However, the actually obtained products generally have a F/C ratio of about 0.52 to about 0.82 due to the peripheral $CF_2$ and $CF_3$ groups.

In practicing the process of the present invention, it is important that a mixture of a graphite material and a fluoride be first contacted with fluorine at a temperature in the range of from room temperature to about 100° C. A graphite intercalation compound of fluoride is formed only under the above-mentioned temperature condition. The pressure of fluorine gas is not critical, but fluorine of 100 to 760 mmHg is usually employed. The amount of intercalant in the intercalation compound before the saturation with the intercalant varies depending on the period of time for which the reaction system is allowed to stand at the above-mentioned temperature condition (this period of time for which the reaction system is allowed to stand before the heating of the reaction system with elevating the temperature is conducted is hereinafter often referred to as "retention time.") At the step of subsequent heating of the reaction system, the low rate of temperature elevation generally causes the intercalant to be slowly released from the intercalation compound, so that the rate of expansion of the interlayer spacing becomes slow. On the contrary, the high rate of temperature elevation generally causes the intercalant to be rapidly released from the intercalation compound, so that the rate of expansion of the interlayer spacing becomes rapid. Therefore, if the rate of temperature elevation in the heating is as low as about 2° to 20° C./min, it is preferred that the subsequent heating be conducted after the reaction system has been subjected to the retention time as defined above for at least about 10 minutes. The retention time has not a critical upper limit, but is usually about 10 minutes to 10 hours. If the temperature elevation rate higher than about 20° C./min is employed, the reaction system may be heated immediately after the introduction of fluorine gas into the mixture of a graphite material and a fluoride has completed, that is, the retention time is 0 hour, since vigorous movement of the intercalant, even if the amount of the intercalant is small, brings about satisfactory release thereof from the intercalation compound and satisfactory expansion of the interlayer spacing. The rate of temperature elevation in the heating step has not critical upper limit, but is preferably not higher than about 100° C./min from the standpoint of economics of construction of the reaction vessel as well as easiness of the heating operation.

The reaction system is then heated preferably to about 300° to 500° C. The reaction period of time is not critical, and the reaction is continued until further weight increase of the product is not observed. The period of time required for completion of the reaction can be extremely shortened as compared with that of the conventional process.

The graphite material to be used in the process according to the present invention may be a natural graphite, artificial graphite, kish graphite or pyrolytic graphite of which the Franklin's P-value is preferably in the range of from 0 to 0.4. The crystallinity or graphitization of a graphite material can be expressed in terms of Franklin's P-value, which is calculated from the formula $$d_{(002)} = 3.440 - 0.086(1 - P^2)$$

wherein $d_{(002)}$ is an interlayer spacing measured by X-ray diffractometry, P is a a Franklin's P-value [see R. E. Franklin, Acta Cryst., 4,235, (1951)]. The particle size of the graphite material may be 1 to 2,000μ, preferably 20 to 2,000μ.

The fluoride to be employed in the process according to the present invention may be a fluoride of at least one element selected from the group consisting of elements of alkali metals and alkaline earth metals, elements belonging to Groups I(b), II(b) and III of the periodic table, and elements of the first period of the transition elements. The term "elements of the first period of transition elements" used herein is intended to mean elements belonging to the first appearing group of transition elements in the periodic table. Specific examples of the elements as mentioned above include Li, Na, K, Be, Mg, Ca, Sr, Cd, B, Al, Ga, Ti, V, Cr, Mn, Fe, Co, Ni, Cu and Zn. The fluoride is suitably used in such an amount that the weight ratio of a fluoride to a graphite material is about 0.5 to 2.

Thus, the process according to the present invention, as described above, enables the reaction period of time required for obtaining a graphite fluoride comprising mainly $(C_2F)_n$ to be extremely shortened. The separation of the intended product from the fluoride released can be easily accomplished, for example, in water by a method similar to the flotation method, since $(C_2F)_n$ has a water-repellent property. When a gaseous fluoride such as titanium fluoride is employed as the fluoride, separation thereof is extremely easy.

The process for preparing a graphite fluoride comprising mainly $(C_2F)_n$ according to the present invention can be carried out not only in a batch-wise method as mentioned above, but also in a flow method capable of manufacturing the product continuously.

The present invention will be illustrated in more detail with reference to the following Examples, which should not be construed as limiting the scope of the present invention. In all Examples, the fluorine content of the product was measured as follows. The product was burnt according to the oxygen flask combustion method and the fluorine was absorbed into water as hydrogen fluoride. The amount of fluorine was determined by employing a fluorine ion electrode.

EXAMPLE 1

In a thermobalance type reactor made of Monel metal, was charged a mixture of 50 mg of a Madagascar-produced flaky natural graphite of 16 mesh size or more and 50 mg of $AlF_3$. As soon as fluorine gas was introduced into the reactor at room temperature to 760 mmHg, the reaction system was heated to 400° C. at a temperature elevation rate of 30° C./min. At that temperature, the reaction was continued for 5 hours. There was obtained a graphite fluoride which had gray color and a F/C ratio of 0.677 in a yield of 100% with respect to the graphite material employed.

EXAMPLE 2

Preparation of a graphite fluoride was carried out in substantially the same manner as in Example 1 except that after the introduction of fluorine gas, the reaction system was heated to 100° C. At that temperature, the reaction system was allowed to stand for 0.5 hour, followed by heating to 400° C. at a temperature elevation rate of 2.5° C./min. At 400° C., the reaction was continued for 9 hours. There was obtain a graphite fluoride which had gray color and a F/C ratio of 0.601 in a yield of 100% with respect to the graphite material employed.

EXAMPLES 3 to 14

Preparation of a graphite fluoride was carried out in substantially the same manner as in Example 2 except that a natural graphite material having a particle size as indicated in Table 1 and a fluoride as indicated in Table 1 were used and that after the introduction of fluorine gas the reaction system was allowed to stand for a retention time as indicated in Table 1, followed by heating in such a manner as indicated in Table 1. At the finally elevated temperature as indicated in Table 1, the reaction was continued for a period of time as indicated in Table 1. There was obtained a graphite fluoride which had gray color and a F/C ratio as shown in Table 1 in a yield of 100% with respect to the graphite material.

TABLE 1

| Example No. | Particle size and Amount of Graphite Material | Kind and Amount of Fluoride | Retention Time After Fluorine Introduction (hr) | Rate of Temperature Elevation (°C./min) | Temperature After Heating (°C.) | Reaction Time After Heating (hr) | F/C Ratio of Graphite Fluoride |
|---|---|---|---|---|---|---|---|
| 3 | 20–40 mesh 0.410 g | AlF$_3$ 0.398 g | 6 | 4.2 | 400 | 5 | 0.647 |
| 4 | –20 mesh 0.5 g | MgF$_2$ 0.505 g | 7 | 3.2 | 390 | 10.75 | 0.527 |
| 5 | 20–48 mesh 0.5 g | LiF 0.5 g | 7 | 4.0 | 365 | 20 | 0.60 |
| 6 | 20–48 mesh 0.403 g | FeF$_3$ 0.358 g | 6 | 4 | 370 | 20 | 0.72 |
| 7 | 20–48 mesh 0.3 g | CaF$_2$ 0.3 g | 5 | 3.8 | 395 | 15 | 0.61 |
| 8 | –20 mesh 0.3 g | CuF$_2$ 0.4 g | 9 | 5 | 400 | 25 | 0.73 |
| 9 | 20–48 mesh 0.27 g | ZnF$_2$ 0.16 g | 0.5 | 4.5 | 390 | 7 | 0.80 |
| 10 | 20–48 mesh 0.3 g | CrF$_3$.3H$_2$O 0.36 g | 3 | 4.5 | 500 | 3 | 0.742 |
| 11 | 400 mesh- 0.03 g | CrF$_3$.3H$_2$O 0.07 g | 0.5 | 4.5 | 500 | 3 | 0.80 |
| 12 | 20–48 mesh 0.3 g | CoF$_2$.3H$_2$O 0.3 g | 0.5 | 5.7 | 430 | 5 | 0.81 |
| 13 | 20–48 mesh 0.302 g | MnF$_2$ 0.201 g | 5 | 4.5 | 380 | 13.5 | 0.73 |

In Examples 1 to 13, the introduction of fluorine gas was effected for about 5 minutes.

Comparative Example 1

Substantially the same procedures as in Example 1 were repeated except that the use of AlF$_3$ was omitted. 80 Hours after initiation of the reaction at 400° C., the product was examined by X-ray diffractometry. In the powder X-ray diffraction pattern, there was still observed a peak due to the carbon remaining unreacted. Two weeks after initiation of the reaction, there was obtained a graphite fluoride having a F/C ratio of 0.62.

Examples 14 to 17 and Comparative Examples 2 to 3

Preparation of a graphite fluoride was carried out in substantially the same manner as in Example 2 except that heat-treated petroleum coke (Franklin's P-value=0.31, heat treatment: 2,800° C. for 30 minutes) of a sieve size of 320 mesh (46μ) was employed in place of the natural graphite and the reaction conditions were varied as indicated in Table 2. There were obtained graphite fluorides having F/C ratios as indicated in Table 2.

TABLE 2

| Example No. | Amount of Graphite Material (g) | Kind and Amount of Fluoride | Time for Introduction (at 20° C.) of Fluorine (min) | Retention Time After Fluorine Introduction (hr) | Rate of Temperature Elevation (°C./min) | Temperature After Heating (°C.) | Reaction Time After Heating (hr) | F/C Ratio of Graphite Fluoride |
|---|---|---|---|---|---|---|---|---|
| 14 | 0.05 | AlF$_3$ 0.05 g | 20 | 20 | 17 | 385 | 7 | 0.65 |
| 15 | 0.05 | AlF$_3$ 0.05 g | 5 | 10 | 17 | 380 | 5 | 0.62 |
| Comparative Example 2 | 0.05 | — | 5 | 10 | 17 | 380 | 11 | 0.60 |
| 16 | 0.30 | MgF$_2$ 0.30 g | 15 | 3 | 4 | 383 | 5 | 0.67 |

TABLE 2-continued

| Example No. | Amount of Graphite Material (g) | Kind and Amount of Fluoride | Time for Introduction (at 20° C.) of Fluorine (min) | Retention Time After Fluorine Introduction (hr) | Rate of Temperature Elevation (°C./min) | Temperature After Heating (°C.) | Reaction Time After Heating (hr) | F/C Ratio of Graphite Fluoride |
|---|---|---|---|---|---|---|---|---|
| 17 | 0.30 | MgF$_2$ 0.30 g | 20 | 3.3 | 5 | 350 | 15 | 0.60 |
| Comparative Example 3 | 0.30 | — | 20 | 3.3 | 5 | 350 | 35 | 0.58 |

What is claimed is:

1. A process for producing a graphite fluoride comprising mainly poly-dicarbon monofluoride which comprises contacting a graphite material having Franklin's P-value of 0 to 0.4 with fluorine at a temperature in the range of room temperature to about 100° C. in the presence of a fluoride of at least one element selected from the group consisting of alkali metals, alkaline earth metals, elements belonging to Groups I(b), II(b) and III of the periodic table, and elements of the first period of the transition elements; and then heating the resulting reaction system to a temperature in the range of about 300° C. to 500° C., at which temperature the reaction system is maintained until a constant weight of the resulting reaction product is attained.

2. A process according to claim 1, wherein said fluoride is used in a weight ratio of 0.5 to 2 relative to said graphite material.

3. A process according to claim 1, wherein the graphite fluoride comprising mainly (C$_2$F)$_n$ has a F/C ratio of about 0.52 to about 0.82.

4. A process according to claim 1, wherein the contact of the graphite material and the fluoride with fluorine is effected for at least 10 minutes and the heating to about 300° C. to about 500° C. is effected at a temperature elevation rate of about 2° to 20° C./min.

5. A process according to claim 1, wherein the contact of the graphite material and the fluoride with fluorine is effected only for a period of time needed for the introduction of fluorine to a reaction system of a graphite material and a fluoride and, immediately thereafter, the heating to about 300° C. to about 500° C. is effected at a temperature elevation rate of about 20° to about 100° C./min.

6. A process according to claim 1, wherein said group of elements consists of Li, Na, K, Be, Mg, Ca, Sr, Cd, B, Al, Ga, Ti, V, Cr, Mn, Fe, Co, Ni, Cu and Zn.

* * * * *